United States Patent
Xi et al.

(10) Patent No.: US 11,790,626 B2
(45) Date of Patent: Oct. 17, 2023

(54) METHOD AND APPARATUS FOR RECOGNIZING BITTING CODE OF KEY, AND STORAGE MEDIUM AND IMAGE COLLECTION DEVICE

(71) Applicant: SHENZHEN XHORSE ELECTRONICS CO., LTD, Guangdong (CN)

(72) Inventors: Yongfeng Xi, Guangdong (CN); Yuan He, Guangdong (CN); Yijie Hao, Guangdong (CN); Guozhong Cao, Guangdong (CN); Chenglong Li, Guangdong (CN); Guoming Huang, Guangdong (CN); Shuli Xi, Guangdong (CN)

(73) Assignee: SHENZHEN XHORSE ELECTRONICS CO., LTD, Guangdong (CN)

( * ) Notice: Subject to any disclaimer, the term of this patent is extended or adjusted under 35 U.S.C. 154(b) by 176 days.

(21) Appl. No.: 17/439,363

(22) PCT Filed: Aug. 27, 2020

(86) PCT No.: PCT/CN2020/111755
§ 371 (c)(1),
(2) Date: Sep. 14, 2021

(87) PCT Pub. No.: WO2021/143146
PCT Pub. Date: Jul. 22, 2021

(65) Prior Publication Data
US 2022/0189135 A1 Jun. 16, 2022

(30) Foreign Application Priority Data
Jan. 18, 2020 (CN) .......................... 202010056497.4
Jan. 18, 2020 (CN) .......................... 202020110251.6

(51) Int. Cl.
*G06T 7/73* (2017.01)
*G06V 10/141* (2022.01)
(Continued)

(52) U.S. Cl.
CPC ............ *G06V 10/141* (2022.01); *B23C 3/355* (2013.01); *G06T 7/73* (2017.01); *G06V 10/145* (2022.01);
(Continued)

(58) Field of Classification Search
CPC .... G06V 10/141; G06V 10/44; G06V 10/145; G06T 7/73; G06T 2207/30136; B23C 3/355; B23C 2235/41
See application file for complete search history.

(56) References Cited

U.S. PATENT DOCUMENTS 6,252,986 B1 * 6/2001 Chang .................... G06V 10/44
382/203
9,818,041 B2 * 11/2017 Mutch .................. G06V 10/141
(Continued)

FOREIGN PATENT DOCUMENTS

CN 10232277 A 1/2012
CN 108140126 A 6/2018
(Continued)

OTHER PUBLICATIONS

Cheewanantakul, Montri, and Suthian Kiatsunthorn. "Duplicate a key using image processing." 2008 SICE Annual Conference. IEEE, 2008.*
(Continued)

*Primary Examiner* — Shefali D Goradia
(74) *Attorney, Agent, or Firm* — Davis Wright Tremaine LLP

(57) ABSTRACT

Disclosed is a method for recognizing a bitting code of a key. The method comprises: using a back light source and/or a lateral light source to collect an image of a key to be recognized; and recognizing, on the basis of the image, a bitting code of the key to be recognized. Further disclosed are an apparatus for recognizing a bitting code of a key, and a storage medium and an image collection device. The present disclosure can improve the efficiency of recognizing (Continued)

a bitting code of a key and reduce the wear of the key during a recognition process.

19 Claims, 9 Drawing Sheets

(51) Int. Cl.
*B23C 3/35* (2006.01)
*G06V 10/44* (2022.01)
*G06V 10/145* (2022.01)

(52) U.S. Cl.
CPC .......... *G06V 10/44* (2022.01); *B23C 2235/41* (2013.01); *G06T 2207/30136* (2013.01)

(56) References Cited

U.S. PATENT DOCUMENTS

| | | | | |
|---|---|---|---|---|
| 2006/0066928 | A1* | 3/2006 | Katou | ................. H04N 1/6077 |
| | | | | 358/518 |
| 2010/0278438 | A1* | 11/2010 | Thompson | .............. G06F 18/22 |
| | | | | 382/209 |
| 2013/0039530 | A1* | 2/2013 | Manigault | .......... G07C 9/00857 |
| | | | | 382/100 |
| 2013/0204423 | A1* | 8/2013 | Overman | ............... G05B 15/02 |
| | | | | 700/117 |
| 2015/0049181 | A1* | 2/2015 | Grice | ..................... H04N 23/74 |
| | | | | 221/133 |
| 2017/0039447 | A1* | 2/2017 | Mutch | ....................... B23C 3/35 |

FOREIGN PATENT DOCUMENTS

| | | | | |
|---|---|---|---|---|
| CN | 21086790 U | | 6/2020 | |
| CN | 111242141 A | | 6/2020 | |
| WO | WO-2015023472 A1 | * | 2/2015 | ............... B23C 3/35 |
| WO | WO-2019218109 A1 | * | 11/2019 | ....... G02F 1/133603 |

OTHER PUBLICATIONS

International Search Report dated Dec. 7, 2020, issued in corresponding International Patent Application No. PCT/CN2020/111755, filed Aug. 27, 2020, 2 pages.

* cited by examiner

METHOD AND APPARATUS FOR RECOGNIZING BITTING CODE OF KEY, AND STORAGE MEDIUM AND IMAGE COLLECTION DEVICE

CROSS-REFERENCE TO RELATED APPLICATIONS

This application is a 371 U.S. National Phase of International Patent Application No. PCT/CN2020/111755, filed Aug. 27, 2020, entitled "METHOD AND APPARATUS FOR RECOGNIZING BITTING CODE OF KEY, AND STORAGE MEDIUM AND IMAGE COLLECTION DEVICE," which claims priority to Chinese Patent Application No. 2020100564974, filed Jan. 18, 2020, entitled "METHOD AND APPARATUS FOR RECOGNIZING BITTING CODE OF KEY, AND STORAGE MEDIUM AND IMAGE COLLECTION DEVICE," and to Chinese Patent Application No. 2020201102516, filed Jan. 18, 2020, entitled "IMAGE ACQUISITION EQUIPMENT, KEY TOOTH CODE RECOGNITION DEVICE AND SYSTEM," the contents of which are incorporated herein by reference in their entirety.

TECHNICAL FIELD

The present disclosure relates to the technical field of image processing, and in particular, to key tooth profile code recognition method and device (i.e., a method and a device for recognizing tooth profile code of key or a method and an apparatus for recognizing bitting code of key), storage medium, and image acquisition device (i.e., an image collection device).

BACKGROUND ART

In the existing tooth profile code recognition technology, generally the key tooth profile parameters are measured by using mechanical equipment to contact the key tooth profile area, and then the key tooth profile code is determined based on the measured key tooth profile parameters. The key tooth profile code is recognized by a purely mechanical method. This kind of key tooth profile code recognition technology, which is purely mechanical, has low recognition efficiency and is easy to cause the loss of the key.

SUMMARY

The main purpose of the present disclosure is to provide a key tooth profile code recognition method and device, storage medium and image acquisition device, which can improve the recognition efficiency of the key tooth profile code and avoid the loss of the key.

In order to achieve the above objective, the present disclosure provides a key tooth profile code recognition method, comprising:
Step 1. using a back light source and/or side light source to acquire an image of a key to be recognized; and
Step 2. recognizing a tooth profile code of the key to be recognized, based on the image.
Optionally, before the step 1, it further comprises:
Step 3. obtaining key model number information of the key to be recognized; and
Step 4. determining a target image acquisition mode corresponding to the key model number information according to an association relationship information between the key model number information and an image acquisition mode.
The step 1 comprises:
Step 11. using the back light source and/or the side light sources to acquire an image of the key to be recognized, based on the target image acquisition mode.
Optionally, the target image acquisition mode comprises a first image acquisition mode in which only the back light source is enabled. The step 11 comprises:
Step 111: acquiring a first image of the key to be recognized under separate illumination of the back light source, based on the first image acquisition mode.
The step 2 comprises:
Step 21: recognizing the tooth profile code of the key to be recognized according to the first image.
Optionally, the target image acquisition mode comprises a second image acquisition mode in which a back light source and a side light source are respectively enabled. The step 11 comprises:
Step 112: acquiring, based on the second image acquisition mode, a first image of the key to be recognized under the separate illumination of the back light source and a second image of the key to be recognized under separate illuminations of the side light sources in different orientations.
The step 2 comprises:
Step 22: recognizing the tooth profile code of the key to be recognized according to the first image and the second image.
Optionally, the target image acquisition mode comprises a third image acquisition mode in which only side light sources are enabled. The step 11 comprises:
Step 113: acquiring, based on the third image acquisition mode, a second image of the key to be recognized under separate illuminations of the side light sources in different orientations, and a third image of the key to be recognized under common illumination of the side light sources in different orientations.
The step 2 comprises:
Step 23: recognizing the tooth profile code of the key to be recognized according to the second image and the third image.
Optionally, the step 2 comprises:
Step 24: performing an image correction on the image to obtain a corrected image after correction; and
Step 25: determining a tooth profile code of the key to be recognized based on the corrected image.
Optionally, the step 2 comprises:
Step 26: detecting a tooth profile image contour of the image;
Step 27: positioning the image tooth profile feature points in the tooth profile image contour according to the pre-stored tooth profile feature point positioning information;
Step 28: obtaining the tooth profile feature parameters in the image tooth profile feature points; and
Step 29: determining the tooth profile code of the key to be recognized based on the tooth profile feature parameters.
Optionally, the tooth profile feature point positioning information comprises positioning feature point information and relative position information between the tooth profile feature point and the positioning feature point, and the step 27 comprises:

Step 271: recognizing the image positioning feature points in the tooth profile image contour according to the positioning feature point information; and Step 272: positioning the image tooth profile feature points in the tooth profile image contour according to the image positioning feature points and the relative position information.

In order to achieve the above object, the present disclosure also provides a key tooth profile code recognition device, and the key tooth profile code recognition device comprising: a memory, a processor, and a recognition program stored in the memory and capable of running on the processor. When the recognition program is executed by the processor, the steps of the key tooth profile code recognition method as described above are realized.

To achieve the above object, the present disclosure also provides a storage medium. A key tooth profile code recognition program is stored on the storage medium. When the key tooth profile code recognition program is executed by the processor, the steps of the key tooth profile code recognition method as described above are realized.

To achieve the above object, the present disclosure also provides an image acquisition device. The image acquisition device is applied in step 1 above. The image acquisition device comprises a back light source and/or a side light source. The image acquisition device also comprises a box body and a camera. The box body is provided with a key inlet outlet opening. The camera and the side light sources are all arranged inside the box body and connected with the inner wall of the box body. The orientation of the camera is perpendicular to the orientation of the key inlet outlet opening. The side light sources are arranged on the periphery of the key placement area in the box body. The back light source is arranged inside the box body, and the back light source is connected to the inner wall of the box body. The camera and the back light source are respectively arranged on two sides of the key placement area.

Optionally, the image acquisition device further comprises a light homogenizing sheet. The light homogenizing sheet is connected to the inner wall of the box body, and is arranged, inside the box body, between the back light source and the key placement area, and it is perpendicular to the direction of the camera.

Optionally, the image acquisition device further comprises a key fixing member. The key fixing member enters the key inlet outlet opening, from the outside of the box body, passing through the side plate where the key inlet outlet opening is located, and fixes the key to be recognized that has entered the key inlet outlet opening.

Optionally, the image acquisition device further comprises a connecting member. The connecting member is connected with the second side plate of the box body. The second side plate faces the camera directly. The back light source is connected with the connecting member.

Optionally, the back light source comprises a first light source fixing plate and a plurality of first luminous bodies. The first luminous bodies are evenly spread and fixed on the first light source fixing plate. The first light source fixing plate is connected with the connecting member.

Optionally, the image acquisition device further comprises a light homogenizing sheet. The connecting member comprises a first layer connecting member and a second layer connecting member. The back light source is connected to the first layer connecting member. The light homogenizing sheet is connected with the second layer connecting member. The light homogenizing sheet is arranged between the back light source and the key placement area, and the light homogenizing sheet is arranged in parallel with the second side plate.

Optionally, the side light source comprises a second light source fixing plate and a plurality of second luminous bodies. A plurality of the second luminous bodies are evenly spread and fixed on the second light source fixing plate. The second light source fixing plate is connected to the connecting member, and the distance between the second luminous body and the second side plate is equal to the distance between the key placement area and the second side plate.

Optionally, the back light source is used to illuminate a key of outer contour type. For the key of this outer contour type, the tooth profile is set at the extreme edges on both sides of the key. The side light source is used to illuminate a key of inner contour type. As for the key of the inner contour type, the tooth profile of the key is set in the inner region inside extreme edges of the two sides of the key, not at the extreme edges.

Optionally, the side light sources are arranged in three orientations, around the key placement area, except for the orientation where the key inlet outlet opening is located, forming a "U" shaped side light source. The key inlet outlet opening is located at the opening side of the "U" shaped side light source.

Optionally, the side light sources set in three orientations are independently controlled.

The present disclosure provides the key tooth profile code recognition method and device, and storage medium. The method comprises: first acquiring an image of the key to be recognized by using a back light source and/or a side light source; and recognizing the tooth profile code of the key to be recognized based on the image. Through the above-mentioned key tooth profile code recognition method, there is no mechanical contact with the tooth profile code part, during the tooth profile code recognition process, which avoids the wear of the key tooth profile. In the recognition process, what needs manual operation is mainly to put the key to be recognized into the image acquisition device. The operation is simple and does not require professional skills. It is helpful to improve the efficiency and accuracy of tooth profile code recognition, wherein the use of the back light source and/or the side light source can highlight the key tooth profile information in the image, which is convenient for image processing and improves the recognition accuracy.

The box body in the image acquisition device provided by the present disclosure plays a role of blocking light, reducing the interference of external light sources and obtaining images containing prominent tooth profile features, which facilitates the tooth profile code recognition on the image, and improves recognition accuracy. By setting the side light sources to illuminate the key to be recognized, the sharpness of the tooth profile contour in the acquired image is improved, the tooth profile features in the image are highlighted, and the recognition accuracy is improved. It is suitable for keys with different tooth profile feature types, and the recognition range is expanded.

BRIEF DESCRIPTION OF DRAWINGS

In order to explain the embodiments of the present disclosure more clearly, the drawings that need to be used in the embodiments will be briefly introduced as follows. Obviously, the drawings in the following description only show some embodiments of the present disclosure. Therefore, they should not be regarded as a limitation to the scope. For those skilled in the art, other drawings can be obtained based on these drawings without creative work.

REFERENCE NUMBERS 1, image acquisition device; 11, box body; 12, camera; 13, back light source; 14, side light source; 111, first side plate; 112, second side plate; S, key placement area; 1111, key inlet outlet opening; 131, first light source fixing plate; 132, first luminous body; 15, connecting member; 141, second light source fixing plate; 142, second luminous body; 16, light homogenizing sheet; 17, key fixing member; V1, concave part; V2, convex part; k1, right angle positioning feature point; k2, vertex positioning feature point; o, tooth profile feature point; 143, first reference point; 144, second reference point.

DETAILED DESCRIPTION OF EMBODIMENTS

In order to make the objects, technical solutions, and advantages of the present disclosure clearer, the present disclosure is further described in detail with reference to the accompanying drawings and embodiments, as follows. It should be understood that the specific embodiments described herein are only used to explain the present disclosure, but not used to limit the present disclosure.

It should be noted that if no conflict, the various features in the embodiments of the present disclosure can be combined with each other, and all fall within the protection scope of the present disclosure. In addition, although the functional modules are formed by certain division in the schematic diagram of the device and the logical sequence is shown in the flowchart, in some cases, different modules can be formed by different division ways from the schematic diagram of the device, or steps shown or described may be executed in a sequence different from that in the flowchart.

The existing key tooth profile code recognition technology relies on purely mechanical methods to recognize the key tooth profile code. This kind of purely mechanical key tooth profile code recognition technology has low recognition efficiency and is easy to cause the loss of the key.

In order to solve the above technical problems, the present disclosure provides a key tooth profile code recognition method. In this method, a back light source and/or side light sources are used to acquire an image of the key to be recognized; and the tooth profile code of the key to be recognized is recognized based on the image. During the recognition process of the tooth profile code, there is no mechanical contact with the tooth profile code part, to avoid wear of the key tooth profile. What requires manual operation in the recognition process is mainly to put the key to be recognized into the image acquisition device. The operation is simple and does not require professional skills, which helps to improve the efficiency and accuracy of tooth profile code recognition.

Figure 1:
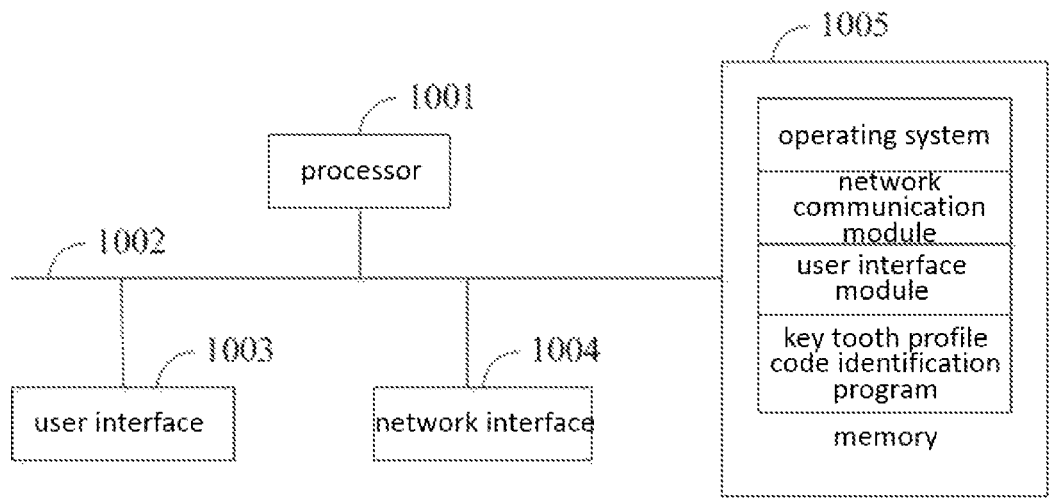
FIG. 1 is a schematic diagram of a hardware operating environment of a terminal involved in the embodiment of the disclosure.

As shown in FIG. 1, FIG. 1 is a schematic structural diagram of a terminal of a hardware operating environment involved in a solution of an embodiment of the present disclosure.

The terminal of the embodiment of the present disclosure may be a PC, a smart phone, a tablet computer, an E-book reader, an MP3 (Moving Picture Experts Group Audio Layer III) player, and a MP4 (Moving Picture Experts Group Audio Layer IV) players, portable computers and other moveable terminal devices with display functions.

As shown in FIG. 1, the terminal may comprise: a processor 1001, such as a CPU; a network interface 1004; a user interface 1003; a memory 1005; and a communication bus 1002, wherein the communication bus 1002 is used to implement the connection and communication between these components. The user interface 1003 may comprise a display and an input unit, such as a keyboard. Optionally, the user interface 1003 may also comprise a wired interface and a wireless interface, which are standard. The network interface 1004 may optionally comprise a wired interface and a wireless interface (such as a WI-FI interface), which are standard. Optionally, the memory 1005 may be a high-speed RAM memory, or a stable memory (non-volatile memory), such as a magnetic disk memory. Optionally, the memory 1005 may also be a storage device independent of the aforementioned processor 1001.

Optionally, the terminal may also comprise a camera, an RF (Radio Frequency) circuit, a sensor, an audio circuit, a WiFi module, and so on. Alternatively, the sensor may be, for example, a light sensor, a motion sensor, and other sensors. Optionally, the light sensor may comprise an ambient light sensor and a proximity sensor, wherein the ambient light sensor may adjust the brightness of the display screen according to the brightness of the ambient light. The proximity sensor can turn off the display screen and/or backlight when the mobile terminal is moved to the ear. As a kind of motion sensor, the gravity acceleration sensor can detect the magnitude of acceleration in various directions (usually three axes). The magnitude and direction of gravity can be detected when being stationary. It can be used to applications for recognizing mobile terminal gestures (such as switching between the horizontal and vertical screens, related games, magnetometer gesture calibration), functions related to vibration recognition (such as pedometer, tapping), etc. Of course, the mobile terminal can also be equipped with other sensors, such as gyroscopes, barometers, hygrometers, thermometers, infrared sensors, etc., which will not be repeated here.

Those skilled in the art can understand that the terminal structure shown in FIG. 1 does not constitute a limitation on the terminal, and may comprise more or less components than those shown in the figure, or a combination of certain components, or the components may be set in different arrangements.

As shown in FIG. 1, the memory 1005, as a computer storage medium, may comprise an operating system, a network communication module, a user interface module, and a key tooth profile code recognition program.

In the terminal shown in FIG. 1, the network interface 1004 is mainly used to connect to a background server and perform data communicate with the background server; the user interface 1003 is mainly used to connect to a client (user terminal) and perform data communicate with the client; and the processor 1001 can be used to call (invoke) the key tooth profile code recognition program stored in the memory 1005 and perform the following operations:

S1. using the back light source and/or the side light source to acquire the image of the key to be recognized; and S2. recognizing the tooth profile code of the key to be recognized based on the image.

Optionally, the processor 1001 may also call a key tooth profile code recognition program stored in the memory 1005 to perform the following operations:

S3. obtaining key model number information of the key to be recognized;

S4. determining the target image acquisition mode corresponding to the key model number information according to the association relationship information between the key model number information and the image acquisition mode; and S11. acquiring an image of the key to be recognized by using the back light source and/or the side light source based on the target image acquisition mode.

Optionally, the target image acquisition mode may comprise the first image acquisition mode in which only the back light source is enabled.

Optionally, the processor 1001 may also call a key tooth profile code recognition program stored in the memory 1005 to perform the following operations:

S111. acquiring a first image of the key to be recognized under the separate illumination of the back light source based on the first image acquisition mode; and S21. recognizing the tooth profile code of the key to be recognized according to the first image.

Optionally, the target image acquisition mode may comprise a second image acquisition mode in which the back light source and the side light sources are respectively enabled.

Optionally, the processor 1001 may also call a key tooth profile code recognition program stored in the memory 1005 to perform the following operations:

S112. acquiring a first image of the key to be recognized under the separate illumination of the back light source based on the second image acquisition mode, and a second image of the key to be recognized under the separate illuminations of the side light sources in different orientations; and S22. recognizing the tooth profile code of the key to be recognized according to the first image and the second image.

Optionally, the target image acquisition mode may comprise a third image acquisition mode in which only side light sources are enabled.

Optionally, the processor 1001 may also call a key tooth profile code recognition program stored in the memory 1005 to perform the following operations:

S113. acquiring, based on the third image acquisition mode, the second image of the key to be recognized under the separate illuminations of the side light sources in different orientations, and the third image of the key to be recognized under common illumination of the side light sources in different orientations; and S23. recognizing the tooth profile code of the key to be recognized according to the second image and the third image.

Optionally, the processor 1001 may also call a key tooth profile code recognition program stored in the memory 1005 to perform the following operations:

S24. performing image correction on the image, to obtain a corrected image after correction; and S25. determining the tooth profile code of the key to be recognized based on the corrected image.

Optionally, the processor 1001 may also call a key tooth profile code recognition program stored in the memory 1005 to perform the following operations:

S26. detecting the tooth profile image contour of the image;

S27. positioning the image tooth profile feature points in the tooth profile image contour according to the pre-stored tooth profile feature point positioning information;

S28. acquiring tooth profile feature parameters in the image tooth profile feature points; and S29. determining the tooth profile code of the key to be recognized based on the tooth profile feature parameters.

Optionally, the tooth profile feature point positioning information may comprise positioning feature point information and relative position information between the tooth profile feature point and the positioning feature point.

Optionally, the processor 1001 may also call a key tooth profile code recognition program stored in the memory 1005 to perform the following operations:

S271. recognizing the image positioning feature points in the tooth profile image contour according to the positioning feature point information; and S272. positioning the image tooth profile feature points in the tooth profile image contour according to the image positioning feature points and the relative position information.

As shown in FIGS. 2-5, based on FIGS. 2-5, the image acquisition device 1 comprises a back light source 13 and/or side light sources 14. The image acquisition device also comprises a box body 11 and a camera 12, wherein the box body 11 is provided with a key inlet outlet opening 1111; the camera 12 and the side light sources 14 are all arranged inside the box body 11 and connected to the inner wall of the box body 11; the orientation of the camera 12 is perpendicular to the orientation of the key inlet outlet opening 1111; the side light source 14 is arranged on the periphery of the key placement area S in the box body 11; and the back light source 13 is arranged inside the box body 11, and the back light source 13 is connected to the inner wall of the box body 11, and the camera 12 and the back light source 13 are respectively arranged on both sides of the key placement area S.

Specifically, the box body 11 is used to fix and support other components of the image acquisition device 1, namely the camera 12, the back light source 13, and the side light source 14, and it is also used to block the light to reduce interference from external light sources, so as to obtain images that are easy to be recognized. Optionally, the box body 11 can be in various shapes and structures, as long as the above arrangement and connection method are achieved. For example, the box body 11 can be a hexahedron, a heptahedron, an octahedron, etc. The box body 11 can optionally be a hexahedron structure, for example, a cuboid or a cube. The box body 11 of a hexahedron structure comprises six side plates, and the six side plates are respectively arranged on the six surfaces. As above, the camera 12, the back light source 13, and the side light source 14 are connected to the inner wall of the box body 11, which indicates that they are arranged inside the box body 11 and directly connected to the side plates of the box body 11 or indirectly connected to the side plates through other connecting members. One side plate of the box body 11 comprises a key inlet outlet opening 1111 for keys to enter and exit the box body 11, and the side plate comprising the key inlet outlet opening 1111 is set as the first side plate 111. The orientation of the key inlet outlet opening 1111 refers to the opening direction of the key inlet outlet opening 1111, and the orientation of the key inlet outlet opening 1111 is perpendicular to the first side plate 111. Generally, the key to be recognized comprises a handle part and a tooth profile part. After the key to be recognized enters the box body 11 from the key inlet outlet opening 1111, the key inlet outlet opening 1111 restricts the handle part of the key to be recognized to be located outside of the box body 11, and the key inlet outlet opening 1111 restricts the key to be recognized to be nearly perpendicular to the first side plate 111. By making the width of the key inlet outlet opening 1111 matched with the thickness of the key to be recognized, the key to be recognized can be made to be perpendicular to the side plate where the key inlet outlet opening is located, after entering the key inlet outlet opening. Of course, in another embodiment, in order to be applicable to keys to be recognized having different sizes, the width of the key inlet outlet opening does not match with the thickness of the key. It is also possible to fix the key to be recognized having entered the inside of the box body 11 by providing a key fixing member, so that after the key to be recognized enters the key inlet outlet opening 1111, it is perpendicular to the side plate where the key inlet outlet opening 1111 is located. The key placement area S refers to the range in which the part of the key to be recognized entering the box body 11 is located in the box body 11, which is schematically shown as a dotted-line area S in FIG. 3. The orientation of the camera 12 is perpendicular to the key placement area S. The distance between the key placement area S and the camera in the orientation direction of the camera is equal to the distance between the key inlet outlet opening 1111 and the camera in the orientation direction of the camera 12.

The camera 12 is used to acquire an image of the key to be recognized. The orientation of the camera 12 refers to the normal direction of the center point of the lens of the camera 12, that is, the shooting direction of the camera 12. Optionally, the camera 12 is connected to any side plate of the box body 11 through a connecting member for a camera 12. The orientation of the camera 12 is perpendicular to that of the key inlet outlet opening 1111, and the orientation of the camera 12 is perpendicular to the second side plate 112 of the box body 11. In one embodiment, when the key to be recognized enters the box body 11 through the key inlet outlet opening 1111, the tooth profile area of the key to be recognized faces the camera 12 directly.

As for the back light source 13 and the side light source 14, the embodiment of the image acquisition device 1 of the present disclosure comprises the following three setting methods: 1) only the back light source 13 is provided, and the side light source 14 is not provided; 2) only the side light sources 14 are provided and the back light source 13 is not provided; 3) the back light source 13 and the side light sources 14 are provided at the same time.

The back light sources 13 are used to illuminate the key to be recognized on the opposite side of the camera 12. Optionally, the back light source 13 may comprise a first light source fixing plate 131 and a first luminous body 132. The first luminous body 132 is fixed on the first light source fixing plate 131. Optionally, the first light source fixing plate 131 is arranged perpendicular to the orientation of the camera 12. The first light source fixing plate 131 is indirectly connected to the box body 11. Specifically, the image acquisition device 1 further comprises a connecting member 15, wherein the connecting member 15 is connected to the second side plate 112, and the first light source fixing plate 131 is placed on the connecting member 15. The first light source fixing plate 131 is connected to the light source, and the first light source fixing plate 131 and the second side plate 112 are parallel to each other, so that the illumination that the back light source 13 makes to the key to be recognized is relatively uniform. The key placement area S refers to an area where the part of the key to be recognized entering the box body 11 is located in the box body 11, and is schematically shown as a dotted-line area S in FIG. 3. The back light source 13 and the camera 12 are respectively arranged on both sides of the key placement area S, so as to obtain a backlight acquisition effect when acquiring images. The back light source 13 is mainly used to illuminate the key of the outer contour type. As for the key of the outer contour type, the tooth profile is set at the extreme edges of both sides of the key. In this way, a key image comprising a complete tooth profile contour is obtained. Optionally, the above-mentioned first luminous body and the following second luminous body refer to various devices used for lighting, for example, LED lights and the like.

The side light source 14 is mainly used to illuminate key of the inner contour type. For the key of the inner contour type, the tooth profile of the key is arranged in the inner region within extreme edges of the two sides of the key, instead of the extreme edges. Under the illumination of the light source in a specific orientation, an image of the key area corresponding to that orientation can be acquired. This image is a key image comprising a partial tooth profile contour. By respectively acquiring images by the side light sources 14 in multiple orientations, complete tooth profile information can be obtained. As for the key of the inner contour type, the image acquired by the side light sources 14 is more accurate and clearer. Optionally, the side light source 14 may comprise a second light source fixing plate 141 and a second luminous body 142. The second luminous body 142 is fixed on the second light source fixing plate 141. The second light source fixing plate is connected to the bottom of the connecting member 15. The second light source fixing plate is arranged outside the key placement area S. And the distance between each second luminous body 142 and the second side plate 112 is equal to the distance between the key placement area S and the second side plate 112. In an embodiment, the side light sources 14 may be provided in three orientations, around the key placement area S, except for the orientation in which the key inlet outlet opening 1111 is located, forming a "U" shaped side light source 14. The key inlet outlet opening 1111 is located at the opening part of the "U" shaped side light source 14. Optionally, the side light sources 14 in three orientations can be independently controlled. Each time an image is acquired, the side light source 14 in one of the orientations is activated. The images of the key to be recognized when the side light sources 14 in three orientations are activated are respectively acquired, so as to recognize the tooth profile code of the key based on the images of the key to be recognized in the three orientations. In an embodiment, the side light source 14 can also be provided at a position between the key inlet outlet opening 1111 and the camera 12 as required. Optionally, the first luminous body 132 and the second luminous body 142 may be luminous bodies of the same type. Regarding the structure and arrangement of the image acquisition device 1 described above, the box body 11 plays a role of blocking the light, reducing interference from external light sources, and obtaining images that comprise prominent tooth-shaped features, which facilitates tooth profile code recognition on the image and improves recognition accuracy. By setting the back light source 13 and the side light sources 14 at two different orientations, the key to be recognized can be illuminated to improve the definition of the tooth profile in the acquired image, highlight the tooth profile features in the image, and improve the accuracy of recognition, and it is applicable for keys with different tooth profile feature types, expanding the recognition range. Optionally, the side light sources may comprise two types, that is, a first side light source and a second side light source. The first side light source and the second side light source are arranged close to each other. The distance between the first side light source and the camera in the orientation direction of the camera is equal to the distance between the key inlet outlet opening and the camera in the orientation direction of the camera. The first side light source is mainly used to acquire the image of the key to be recognized of the inner convex contour type, and the second side light source is used to acquire the image of the key to be recognized of the inner concave contour type.

Figure 3:
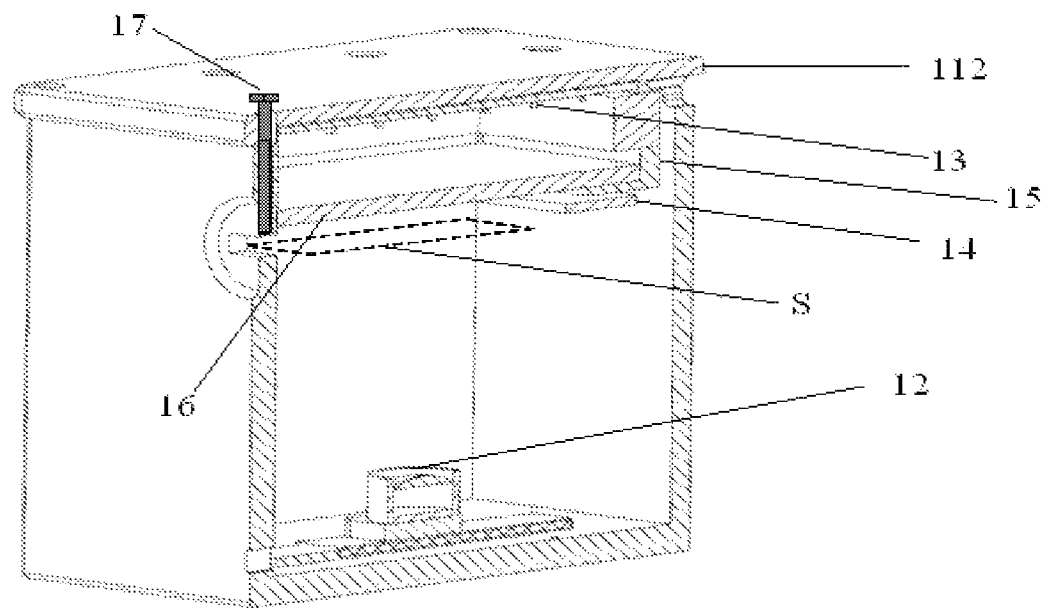
FIG. 3 is a schematic sectional structure diagram of the image acquisition device shown in FIG. 2.
Figure 4:
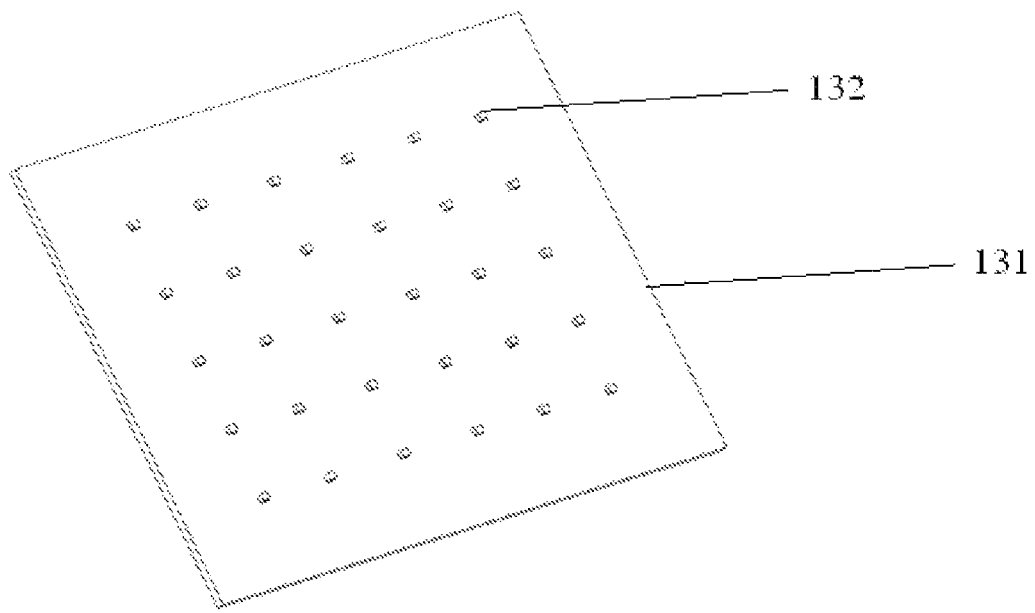
FIG. 4 is a schematic structural diagram of a back light source provided by an embodiment of the present disclosure.

As shown in FIG. 3, in an embodiment, the image acquisition device 1 further comprises a light homogenizing sheet 16. The light homogenizing sheet 16 is connected to the inner wall of the box body 11 and is arranged inside the box body 11, specifically, it is arranged between the back light source 13 and the key placement area S, and is perpendicular to the orientation of the camera 12.

Specifically, the connection between the light homogenizing sheet 16 and the inner wall of the box body 11 refers to that the light homogenizing sheet 16 is arranged inside the box body 11 and is directly connected to one side plate of the box body 11, or is indirectly connected to one side plate of the box body 11 through a connecting member 15. The light homogenizing sheet 16 is disposed between the back light source 13 and the key inlet outlet opening 1111, that is, the light homogenizing sheet 16 is disposed between the back light source 13 and the key placement area S. In some embodiments, the connecting member 15 comprises a first layer connecting member and a second layer connecting member. The back light source 13 is connected to the first layer connecting member, and the light homogenizing sheet 16 is connected to the second layer connecting member. The light homogenizing sheet is arranged between the back light source and the key placement area, and the light homogenizing sheet 16 is arranged in parallel with the second side plate. The light emitted from the back light source 13 is uniformly irradiated on the key to be recognized after being homogenized by the light homogenizing sheet 16, so that the definition of the acquired image can be improved, so that the tooth profile code can be recognized based on the image, and the recognition accuracy of the tooth profile code can be improved.

Figure 2:
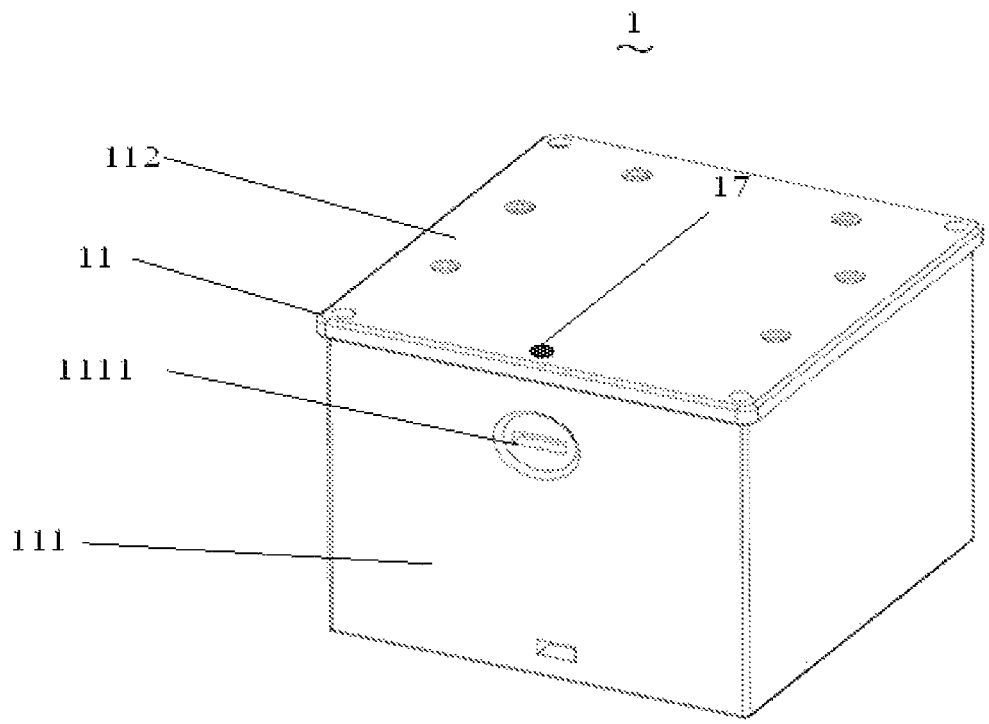
FIG. 2 is a schematic structural diagram of an image acquisition device provided by an embodiment of the disclosure.

As shown in FIGS. 2 and 3, in one embodiment, the key fixing member 17 enters the key inlet outlet opening 1111 from the outside of the box body 11 through the side plate where the key inlet outlet opening 1111 is located, so as to fix the key to be recognized having entered the key inlet outlet opening 1111.

Specifically, the key fixing member 17 is used to press the key to be recognized after the key to be recognized being inserted into the box body 11 from the key inlet outlet opening 1111, so as to fix the key to be recognized. Optionally, the key fixing member 17 may comprise a fixing screw, wherein when the key fixing member 17 is a screw, a threaded channel extending from the outside of the box body 11 to the key inlet outlet opening 1111 is provided in the first side plate 111. The size of the threaded channel matches with the size of the fixing screw. The fixing screw enters the key inlet outlet opening 1111 from the outside of the box body 11 through the threaded channel. After the key to be recognized enters the inside of the box body 11, the key to be recognized can be fixed by the fixing screw being tightened. After the image is acquired, the key to be recognized can be loosened by the fixing screw being loosened. The key fixing member 17 is set and the key to be recognized is fixed by the key fixing member 17, such that the key to be recognized can be made parallel to the second side plate 112. And the key to be recognized can be prevented from moving or shaking during image acquisition process, thereby improving image quality.

Figure 6:
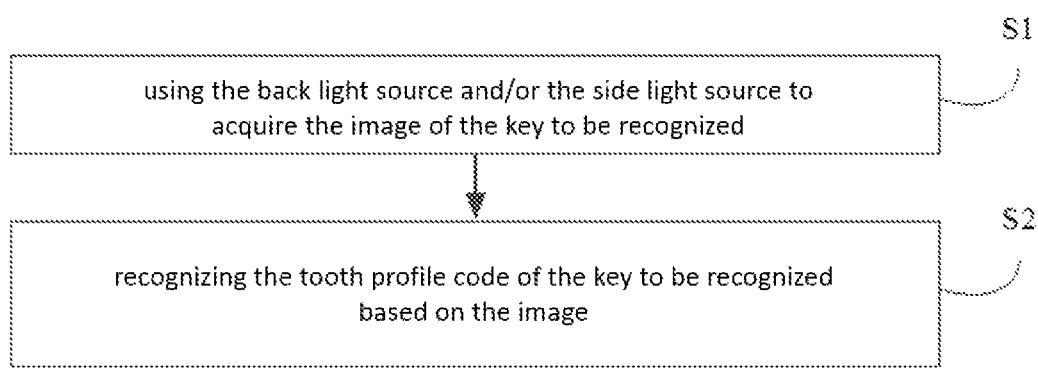
FIG. 6 is a schematic flowchart of a key tooth profile code recognition method provided by an embodiment of the present disclosure.

Referring to FIG. 6, FIG. 6 is a schematic flowchart of a key tooth profile code recognition method provided by an embodiment of the present disclosure. The key tooth profile code recognition method comprises:

Step 1. using the back light source and/or the side light source to acquire the image of the key to be recognized.

Figure 7:
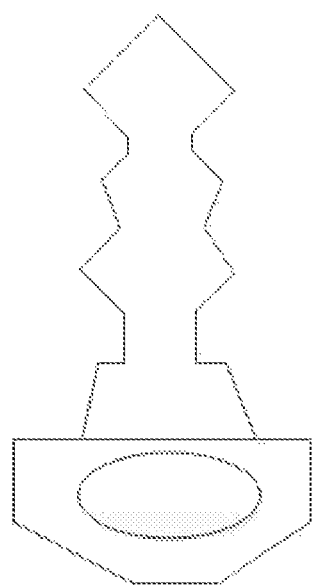
FIG. 7 is a schematic diagram of the shape of a key of outer contour type provided by an embodiment of the present disclosure.
Figure 8:
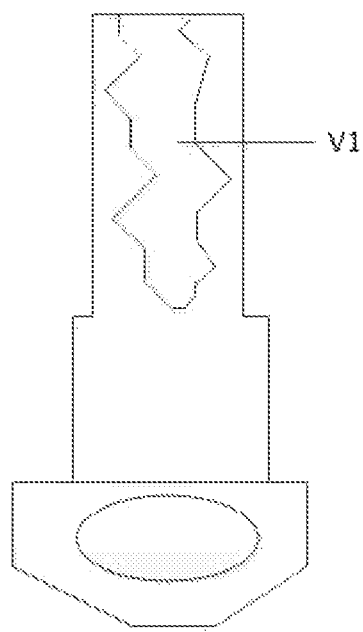
FIG. 8 is a schematic diagram of the shape of a key of inner concave contour type provided by an embodiment of the present disclosure.
Figure 9:
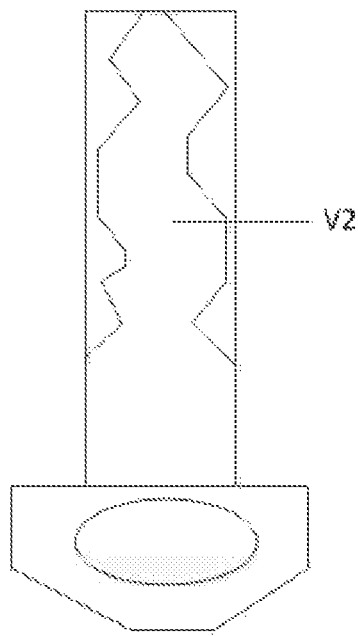
FIG. 9 is a schematic diagram of the shape of a key of an inner convex contour type provided by an embodiment of the present disclosure.

Specifically, the key to be recognized refers to the key that needs to be subject to the tooth profile code recognition. The key tooth profile code recognition method of the present disclosure can be applied to keys containing tooth profiles, such as door lock keys and car keys. The keys to be recognized are classified into different types, such as outer contour type and/or inner contour type, according to the key tooth profile features. A key with a tooth profile arranged on the extreme edge of one side or both sides of the key is classified as an outer contour type. The shape of a key of the outer contour type is shown in FIG. 7 schematically. A key with a tooth profile arranged within the edges on both sides of the key is classified as an inner contour type. Optionally, the keys of the inner contour key type can be further classified into the inner concave contour type and the inner convex contour type based on the concave or convex features of the tooth profile area. There is a concave part V1 within both sides of the key of the inner concave contour type. The tooth profile of the key is arranged in the concave part V1. The shape of a key of the inner concave contour type is shown in FIG. 8 schematically. There is a convex part V2 within both sides of the key of the inner convex contour type. The tooth profile of the key is arranged on the convex part V2. The shape of a key of the inner convex contour type is schematically shown in FIG. 9.

Step 1 comprises, but is not limited to, the following execution methods: 1) acquiring the image of the key to be recognized under the separate illumination of the back light source; 2) acquiring the image of the key to be recognized under the separate illumination of the back light source, and acquiring the image of the key to be recognized under the separate illumination of the side light source; 3) acquiring the image of the key to be recognized under the common illumination of multiple side light sources, and acquiring the image of the key to be recognized under the separate illumination of the side light source; 4) acquiring the image of the key to be recognized under the separate illumination of the side light source. Here, the above-mentioned separate illumination means that the light source in only one orientation is activated, and light sources in all other orientations are turned off. The acquiring the image of the key to be recognized under the separate illumination of the side light source comprises that only the image of the key to be recognized under the separate illumination of one side light source is acquired, or the image of the key to be recognized under the separate illumination of each of multiple side light sources is acquired. Through the above methods, as for all keys with different tooth profile features, images containing the prominent tooth profile information can be acquired.

Step 2. recognizing the tooth profile code of the key to be recognized, based on the image.

Before performing step 2, the model number information of the key to be recognized can be obtained, and then the tooth profile code of the key to be recognized can be recognized based on the model number information and the acquired image. For example, the model number information input into a model input frame is acquired based on a model input instruction, or the selected model number information is acquired based on a model selection instruction. Then the pre-stored tooth profile feature point positioning information is obtained according to the model number information. After obtaining the image of the key to be recognized, the image is processed. The tooth profile features in the image is extracted to obtain the tooth profile code of the key to be recognized. Optionally, the preprocessing operations, such as perspective transformation, rotation, and/or scaling, may be performed on the image firstly, to obtain a corrected image. Then the tooth profile image contour is recognized from the corrected image, then the positioning feature points are recognized from the tooth profile image contour based on the tooth profile feature point positioning information, then the tooth profile feature point o is recognized based on the positioning feature point, and then the imaging parameters of the tooth profile feature points are obtained from the image, so as to obtain tooth profile feature parameters. According to the obtained tooth profile feature parameters, the tooth profile code of the key to be recognized is obtained. Of course, in some embodiments, the model number of the key can also be recognized based on the acquired image.

In the above key tooth profile code recognition method, the back light source and/or the side light sources are used to acquire the image of the key to be recognized, and then the tooth profile code of the key to be recognized is recognized based on the image. Through the above-mentioned key tooth profile code recognition method, there is no mechanical contact with the tooth profile code part during the tooth profile code recognition process, so as to avoid the wear of the key tooth profile. What requires manual operation in the recognition process is mainly to put the key to be recognized into the image acquisition device 1. The operation is simple and does not require professional skills, which is beneficial to improve the efficiency and accuracy of tooth profile code recognition, and the back light source and/or the side light sources can be used to highlight the key tooth profile information in the image, which is convenient for improving the recognition accuracy in the image processing.

Figure 10:
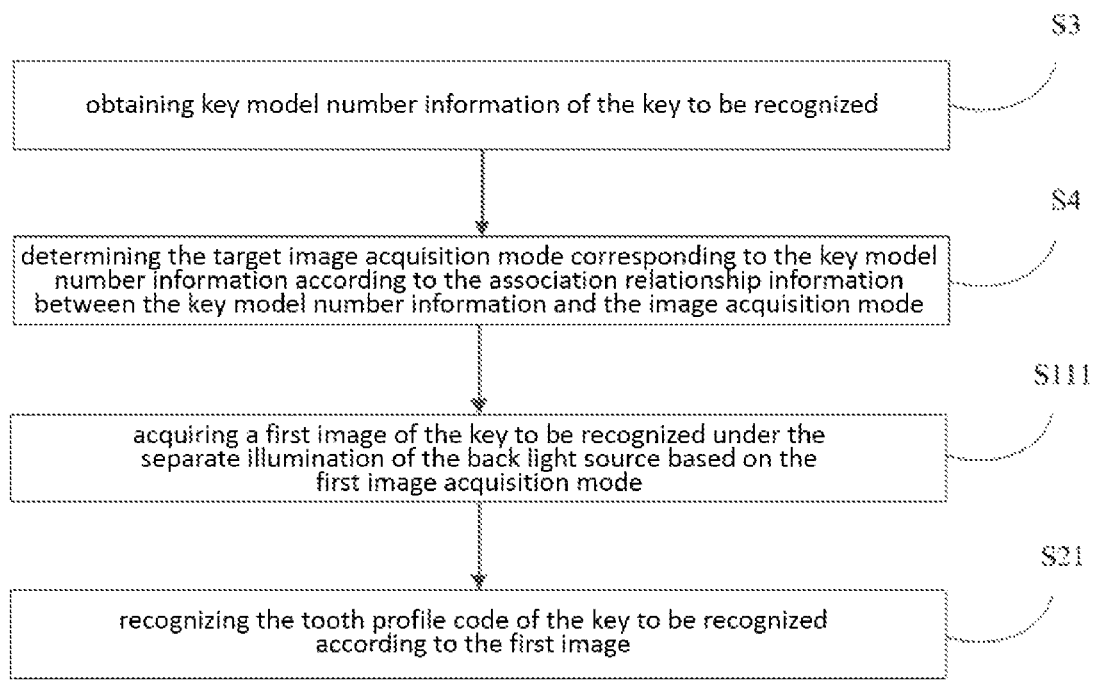
FIG. 10 is a schematic flowchart of a key tooth profile code recognition method provided by another embodiment of the present disclosure.

As shown in FIG. 10, in another embodiment, before step 1, it further comprises:

Step 3. obtaining the key model number information of the key to be recognized.

Specifically, the key model number is a pre-set type code for a key. One key model number corresponds to one key type. Corresponding to the same key billet, the number of teeth is the same and the positions of the teeth are same. Different keys having the same key model number have different tooth profile codes. The key contour type information can be determined based on the key model number. In the embodiment of the key tooth profile code recognition method of the present disclosure, the key model number information of the key to be recognized can be obtained by means of acquiring the input or selected key model number information. Specifically, in the process of recognizing the key tooth profile code, an input box for inputting relevant information of the key model number information may be displayed firstly, so as to obtain the key model number information of the key to be recognized from the input box. Of course, the key model number information can also be displayed in the form of a list, and the selected key model number information can be obtained as the key model number information of the key to be recognized.

In addition, image recognition technology can also be used to recognize the key model number information of the key to be recognized. For example, as for key model number information, such as outer contour type and inner contour type, during the process of acquiring the key model number information of the key to be recognized, the image of the key to be recognized comprising the tooth profile area can be firstly obtained, and then the tooth profile area of the image is determined, and the key model number information is determined based on the tooth profile area. Alternatively, the image of the key to be recognized is made to be compared with the pre-stored images corresponding to individual key model number information, to calculate the similarity, and the key model number information corresponding to the pre-stored image with the highest similarity is used as the key model number information of the key to be recognized.

Step 4. determining the target image acquisition mode corresponding to the key model number information according to the association relationship information between the key model number information and the image acquisition mode.

Based on the above embodiments, the side light sources comprise two types, which are the first side light source and the second side light source. The first side light source and the second side light source are arranged close to each other. The distance between the first side light source and the camera in the orientation direction of the camera is equal to the distance between the key inlet outlet opening and the camera in the orientation direction of the camera. The first side light source is mainly used to acquire the image of the key to be recognized of the inner convex contour type. The second side light source is used to acquire the image of the key to be recognized of the inner concave contour type.

The image acquisition modes comprise: 1) acquiring the image of the key to be recognized under the separate illumination of the back light source, which mode is suitable for the key to be recognized of the outer contour type; 2) acquiring the image under the separate illumination of the back light source, and acquiring the image of the key to be recognized under the separate illumination of the first side light source in one orientation, which mode is suitable for the key to be recognized of inner convex contour type having the tooth profile on single side; 3) acquiring the image under the separate illumination of the back light source, and acquiring the image of the key to be recognized under the separate illumination of each of the first side light sources in two or more orientations, which mode is suitable for the key to be recognized of the inner convex contour type having the tooth profiles on double sides; 4) acquiring the image under the separate illumination of the back light source, and the image of the key to be recognized under the separate illumination of the second side light source in one orientation is acquired, which mode is suitable for the key to be recognized of inner concave contour type having tooth profile on single side; 5) acquiring the image under the separate illumination of the back light source, and acquiring the image of the key to be recognized under the separate illumination of each of the second side light sources in two or more orientations, which mode is suitable for the key to be recognized of the inner concave contour type having the tooth profiles on double sides. Of course, the means of acquiring the image of the key to be recognized under the separate illumination of the back light source in each of the above methods can be replaced by two means, that is, the image of the key to be recognized under the common illumination of the first side light sources in two opposite orientations is acquired, or the image of the key to be recognized under the common illumination of the second side light sources in two opposite orientations is acquired.

The target image acquisition mode refers to the image acquisition mode corresponding to the key model number information of the key to be recognized when each time the tooth profile code recognition is performed.

Based on the above image acquisition mode and the applicable key contour type, the key model number can be associated with the applicable image acquisition mode in advance, to generate the association relationship information between the key model number and the image acquisition mode. For example, the association relationship information can be an association relationship table between the key model numbers and the image acquisition mode.

Based on step 1, after obtaining the key model number information of the key to be recognized, when performing step 4, the key model number information of the key to be recognized is compared with the key model numbers in the above-mentioned association relationship table, to determine the target key model number matching with the key model number in association relationship table, and the image acquisition mode associated with the target key model number is obtained from the association relationship table, as the target image acquisition mode.

The step 1 comprises:
Step 11. using the back light source and/or the side light sources to acquire an image of the key to be recognized, based on the target image acquisition mode.

Based on step 4, after determining the target image acquisition mode, the step 11 is performed. The light source in the corresponding orientation is turned on based on the target image acquisition mode, and the camera is used to acquire images. After one image is acquired, the originally activated light source may be turned off firstly and the light source in the orientation which the next image corresponds to is turned on, and the image is acquired again.

Specifically, based on the foregoing description, if the key to be recognized is of the outer contour type, the target image acquisition mode determined in step 4 performed may be the foregoing image acquisition mode 1). After starting the back light source based on the image acquisition mode 1), the camera is used to acquire the image of the key to be recognized under the back light source. If the key to be recognized is of the inner convex contour type having tooth profile at a single side, the back light source can be activated firstly, and then the camera is used to acquire an image of the key to be recognized under the illumination of the back light source. The back light source is turned off and then the first side light source in the orientation opposite to the key tooth profile is activated, and the image is acquired again. If the key to be recognized is of the inner convex contour type having tooth profiles on double sides, it is possible to start the back light source firstly and turn off other light sources. The image of the key to be recognized under the separate illumination of the back light source is acquired. After turning off the back light source, the first side light source in the first orientation is activated. The camera is used to acquire the image of the key to be recognized under the separate illumination of the side light source in that orientation, and then the first side light source in the first orientation is turned off. Afterwards, the first side light source in the second orientation is activated. A camera is used to acquire an image of the key to be recognized under the illumination of the side light source in the second orientation. If the key to be recognized is of the inner concave contour type having tooth profile on a single side, it is possible to turn on the back light source firstly. The camera is used to acquire the image of the key to be recognized under the separate illumination of the back light source. After turning off the back light source, the second side light source in one of the orientations is activated. A camera is used to acquire an image of the key to be recognized under the separate illumination of the second side light source. If the key to be recognized is of the inner concave contour type having tooth profiles on double sides, it is possible to turn on the back light source firstly. The camera is used to acquire the image of the key to be recognized under the separate illumination of the back light source. After turning off the back light source, the second side light source in the first orientation is activated. The camera is used to acquire the image of the key to be recognized under the separate illumination of the side light source in that orientation. Then, after turning off the second side light source in the first orientation, the second side light source in the second orientation is activated, and the camera is used to acquire the image of the key to be recognized under illumination of the side light source in the second orientation. Specifically,
Step 2. determining the tooth profile code of the key to be recognized based on the image.

Based on step 2, after obtaining the image of the key to be recognized, the image is processed. The tooth profile features in the image are extracted to obtain the tooth profile code of the key to be recognized. Optionally, the preprocessing operations, such as perspective transformation, rotation, and/or scaling, may be performed on the image firstly, to obtain a corrected image. Then the tooth profile image contour is recognized from the corrected image. Then the positioning feature points are recognized from the tooth profile image contour. Then the tooth profile feature point o is recognized based on the positioning feature points, and then the imaging parameters of the tooth profile feature points are obtained from the image, so as to obtain the tooth profile feature parameters. According to the obtained tooth profile feature parameters, the tooth profile code of the key to be recognized is obtained. For a key of the outer contour type, the tooth profile code of the key can be determined directly from the outermost edge contour of the image. As for a key of the inner contour type, the image acquired by the back light source and the image acquired by the side light sources can be combined into a same coordinate system. The outermost edge features of the key are provided by the image acquired by the back light source, and the features of the part, where the key tooth profile is located, are provided by the image acquired by the side light sources. The tooth profile code of the key to be recognized is determined based on the outermost edge feature and the features of the tooth profile part.

The execution entity for executing the embodiment of the key tooth profile code recognition method of the present disclosure comprises mobile terminals, such as smart phones or tablet computers, etc., and also comprises fixed terminals, such as personal computers or servers, etc. The execution entity for executing the above-mentioned key tooth profile code recognition method is communicatively connected with the image acquisition device 1. After performing step 3 and step 4, when performing step 1, the execution entity sends the image acquisition instruction to the image acquisition device 1 based on the found orientation of the light source of the camera. The image acquisition device 1 performs the image acquisition on the key to be recognized inserted into the box body 11 based on the image acquisition instruction, and sends the acquired image to the execution entity. The execution entity obtains the image of the key to be recognized, and then executes step 2. Of course, the image acquisition device 1 can also be equipped with a user interaction device, such as a touch screen and/or a mouse etc., and the processor that executes steps 1-4 is built in the image acquisition device 1. The image acquisition device 1 itself serves as the execution entity of the key tooth profile code recognition method of the present disclosure.

In the key tooth profile code recognition method of the above embodiment, the key model number information of the key to be recognized is firstly obtained, and then the orientation of the light source of the camera corresponding to the key model number information is found by means of the association relationship information between the pre-stored key model numbers and the light source orientations. The image of the key to be recognized is acquired based on the orientation of the light source of the camera, and then the tooth profile code of the key to be recognized is determined from the image. Through the above key tooth profile code recognition method, there is no mechanical contact with the tooth profile code part in the tooth profile code recognition process, so as to avoid the wear of the key tooth profile. In the recognition process, what requires manual operation is mainly to put the key to be recognized into the image acquisition device 1. The operation is simple and does not require professional skills, which is beneficial to improve the efficiency and accuracy of tooth profile code recognition.

Figure 11:
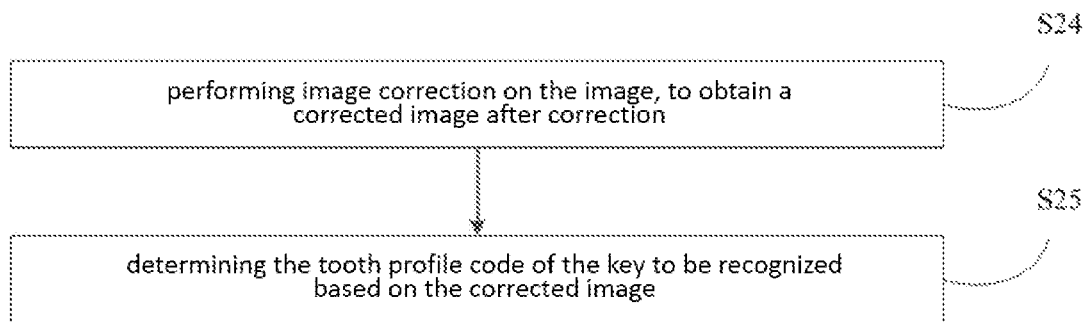
FIG. 11 is a schematic flowchart of step 2 provided by an embodiment of the present disclosure.

In one embodiment, as shown in FIG. 11, step 2 comprises:

Step 24. performing image correction on the image to obtain a corrected image after correction; and Step 25. determining the tooth profile code of the key to be recognized based on the corrected image.

Specifically, based on the foregoing embodiment, after obtaining the image of the key to be recognized, image correction may be performed on the obtained image firstly to obtain a corrected image after correction. Optionally, the image correction may comprise the preprocessing processes, such as perspective transformation, rotation, and/or scaling. In the embodiment of the present disclosure, the perspective transformation processing is preferable. Taking the perspective transformation processing as an example, the association relationship between the key type and the perspective feature point information corresponding to the key type can be pre-established. In the implementation process, the four perspective feature points in the acquired image can be firstly recognized based on the key type, and the original coordinates of the four perspective feature points in the original image can be obtained. The perspective transformation matrix is calculated according to the original coordinates of the perspective feature points and the set target coordinates, and then the perspective transformation matrix is used to perform the perspective transformation processing on the acquired image, so as to obtain a corrected image after the perspective transformation processing. Then the tooth profile features are extracted from the corrected image to obtain the tooth profile code of the key to be recognized. If there are multiple images acquired by the camera light sources in different orientations as for the same key to be recognized, the perspective transformation matrix is calculated based on one of the images, and then the same perspective transformation matrix is used to perform the perspective transformation processing on multiple images of the same key to be recognized, so as to obtain multiple corrected images on the same plane and with the same transformation specifications.

In the key tooth profile code recognition method of the above embodiment, the acquired image is corrected firstly, and then the tooth profile code of the key to be recognized is extracted from the corrected image. Through the above-mentioned image correction processing process, the specification parameter ratio of the key to be recognized itself can be restored in the image, so that the ratio of the imaging parameters of the image is consistent with the ratio of the specification parameters of the key itself, avoiding the recognition error which is caused by the oblique placement of the key to be recognized in the image acquisition device 1, and therefore the accuracy of tooth profile code recognition is improved.

Figure 12:
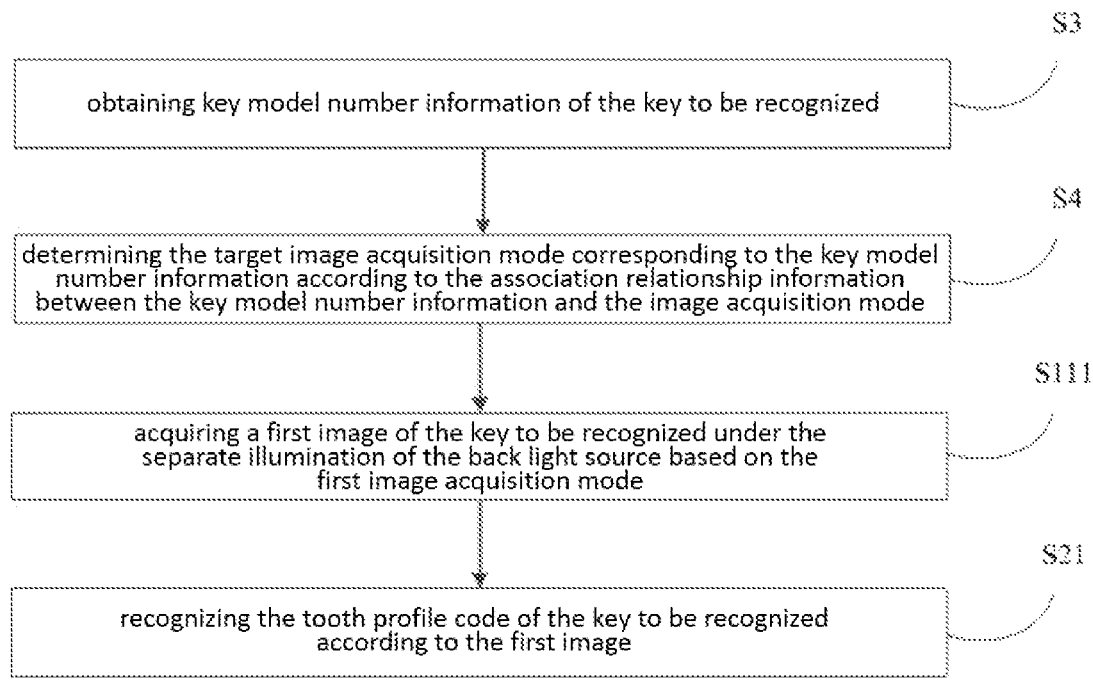
FIG. 12 is a schematic flowchart of implementation of steps 11 and 2 provided by an embodiment of the present disclosure.

In an embodiment, the target image acquisition mode comprises the first image acquisition mode in which only the back light source is enabled. As shown in FIG. 12, step 11 comprises:

Step 111. acquiring a first image of the key to be recognized under the separate illumination of the back light source, based on the first image acquisition mode.

Specifically, the first image acquisition mode refers to a mode in which only the back light source is enabled for image acquisition. The first image refers to the image acquired by the first image acquisition mode. The first image acquisition mode corresponds to the image acquisition mode 1) of the above-mentioned embodiment, that is, based on the image acquisition mode 1), the back light source is activated, and the light sources other than the back light source are turned off, and then the camera is used to acquire the image of the key to be recognized under the back light source. Based on the above-mentioned embodiment, the first image acquisition mode is suitable for the key to be recognized of the outer contour type. Therefore, the key model number of the outer contour type can be associated with the first image acquisition mode in advance.

The step 2 comprises:

Step 21. recognizing the tooth profile code of the key to be recognized according to the first image.

Figure 5:
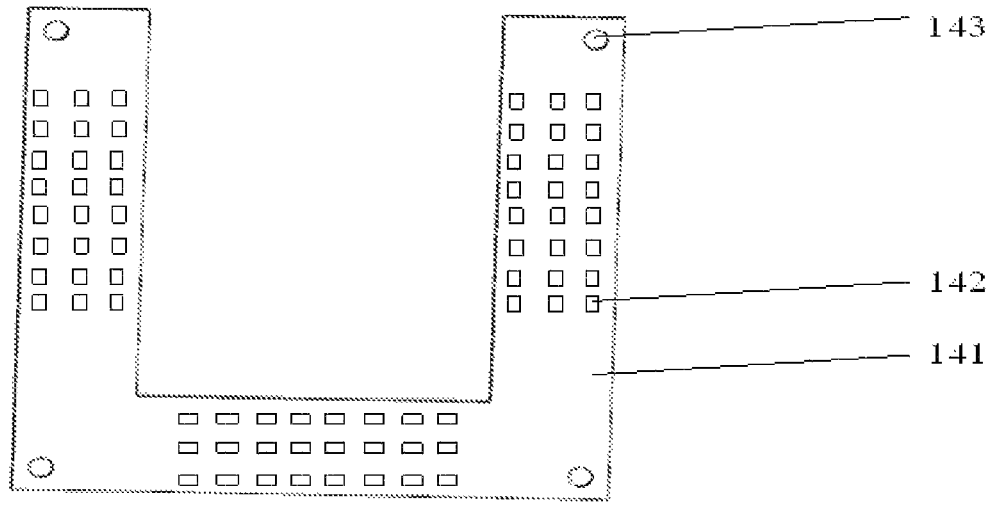
FIG. 5 is a schematic structural diagram of a side light source provided by an embodiment of the present disclosure.
Figure 13:
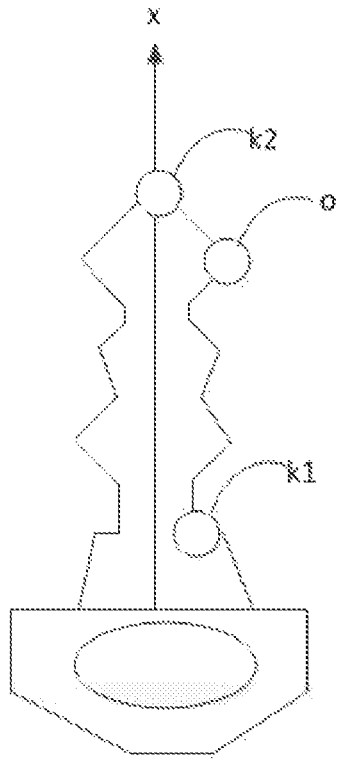
FIG. 13 is a schematic diagram of positioning feature points and a tooth profile feature points of the key provided by an embodiment of the present disclosure.

Specifically, based on the foregoing embodiment, after the first image is obtained, the tooth profile code can be determined from the outer contour features. The outer contour feature refers to the imaging parameters of the teeth in the image. As shown in FIG. 13, as for keys of outer contour type in the same model number, the key apex and/or the right-angle point of the key shoulder can be taken as the positioning feature points, and the tooth point is the tooth profile feature point o. Here, the distance between each tooth of keys of the same type and the positioning feature point in the X direction is constant. More than three reference points are set on the second light source fixing plate 141 of the U shaped side light source 14, as shown in FIG. 5. The actual distance between the first reference point 143 and the second reference point 144 and the actual distance between the positioning feature point and the tooth profile feature point o are pre-stored. Based on the image correction of the above embodiment, the x direction of the key is made to be parallel to the x' axis of the image, and the key image is located on the plane where the reference point is located. After obtaining the first image, the reference points and image positioning feature points in the image are firstly recognized; the image transformation ratio is determined based on the distance between the reference point in the image and the pre-stored reference point; based on the image positioning feature points in the image and x' axis, the image rectangular coordinate system is constructed in the corrected image plane; the position of the tooth in the image rectangular coordinate system is determined based on the transformation ratio and the distance between the pre-stored positioning feature point and the tooth profile feature point o; and the value of the tooth in the image on the y' axis perpendicular to x' axis is obtained as the outer contour feature of the first image. Of course, it is also possible to use a corner point of the plane after the perspective transformation as the origin, and the two sides of the corner point as the x' axis and y' axis, so as to construct the image rectangular coordinate system. After obtaining the value of each tooth in the image on the y' axis, the actual value sequence of each tooth can be obtained based on the transformation ratio between the image and the actual status, and this sequence can be used as the tooth profile code of the key.

In the above key tooth profile recognition method, the first image of the key to be recognized under the separate illumination of the back light source is acquired based on the first image acquisition mode. The tooth profile code of the key to be recognized is recognized according to the first image. The above mode is suitable for the key to be recognized of the outer contour type. Using the back light source to acquire images can highlight the tooth profile of the key of the outer contour type, which is convenient for image recognition. The realization process is relatively simple, which is beneficial to improve the recognition efficiency and accuracy of the key tooth profile code.

Figure 14:
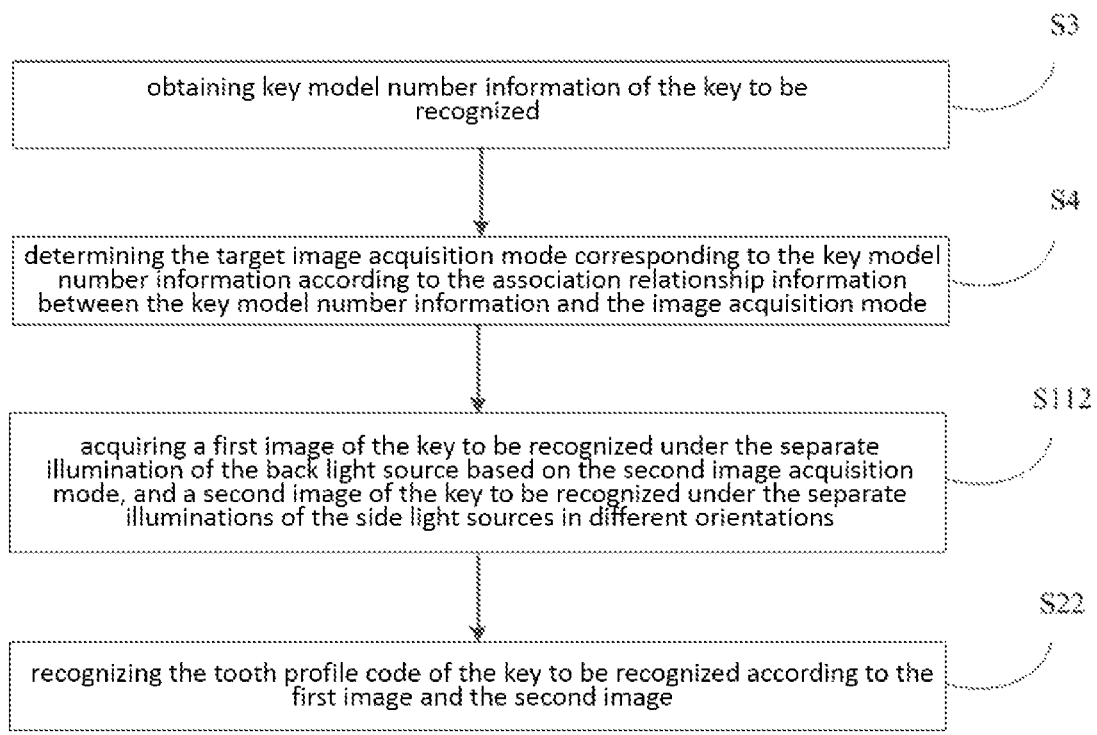
FIG. 14 is a schematic flowchart of implementation of steps 11 and 2 provided by another embodiment of the present disclosure.

As shown in FIG. 14, in an embodiment, the target image acquisition mode comprises a second image acquisition mode in which a back light source and side light sources are respectively activated. The step 11 comprises:

Step 112. acquiring a first image of the key to be recognized under the separate illumination of the back light source based on the second image acquisition mode, and the second image of the key to be recognized under separate illuminations of the side light sources in different orientations.

The second image acquisition mode refers to an image acquisition mode in which the back light source and the side light sources are respectively activated for image acquisition. The first image has the definition consistent with that of the first image in the above-mentioned embodiment. The second image refers to an image acquired when the object to be recognized is illuminated individually by side light source in one orientation. This image acquisition mode is suitable for keys to be recognized with inner contour features. If the key to be recognized is of the inner convex contour type having tooth profiles on double sides, the back light source can be activated firstly, and other light sources are turned off. The image of the key to be recognized under the separate illumination of the back light source is acquired. After the back light source is turned off, the first side light source in the first orientation is started, and the camera is used to acquire the image of the key to be recognized under the separate illumination of the side light source in that orientation. Then the first side light source in the second orientation is started, and the camera is used to acquire the image of the key to be recognized under the illumination of the side light source in the second orientation.

The step 2 comprises:

Step 22. recognizing the tooth profile code of the key to be recognized according to the first image and the second image.

As for a key of the outer contour type, the key tooth profile code can be determined directly from the outermost edge contour of the image. As for a key of the inner contour type, the image acquired by the back light source and the image acquired by the side light source can be combined into the same coordinate system, wherein the image acquired by the back light source provides the outermost edge features of the key, and the features of the part of the key where the tooth profile is located are provided by the image acquired by the side light source. The tooth profile code of the key to be recognized is determined based on the outermost edge features and the features of the tooth profile part. In the above key tooth profile recognition method, based on the second image acquisition mode, the first image of the key to be recognized under the separate illumination of the back light source, and the second image of the key to be recognized under the separate illuminations of the side light sources in different orientations are acquired. The tooth profile code of the key to be recognized is recognized according to the first image and the second image. Through the above mode, the outer contour boundary feature and the inner contour tooth profile feature of the key of the inner contour type can be respectively highlighted in different images, which is beneficial to improve the accuracy of key tooth profile code recognition.

Figure 15:
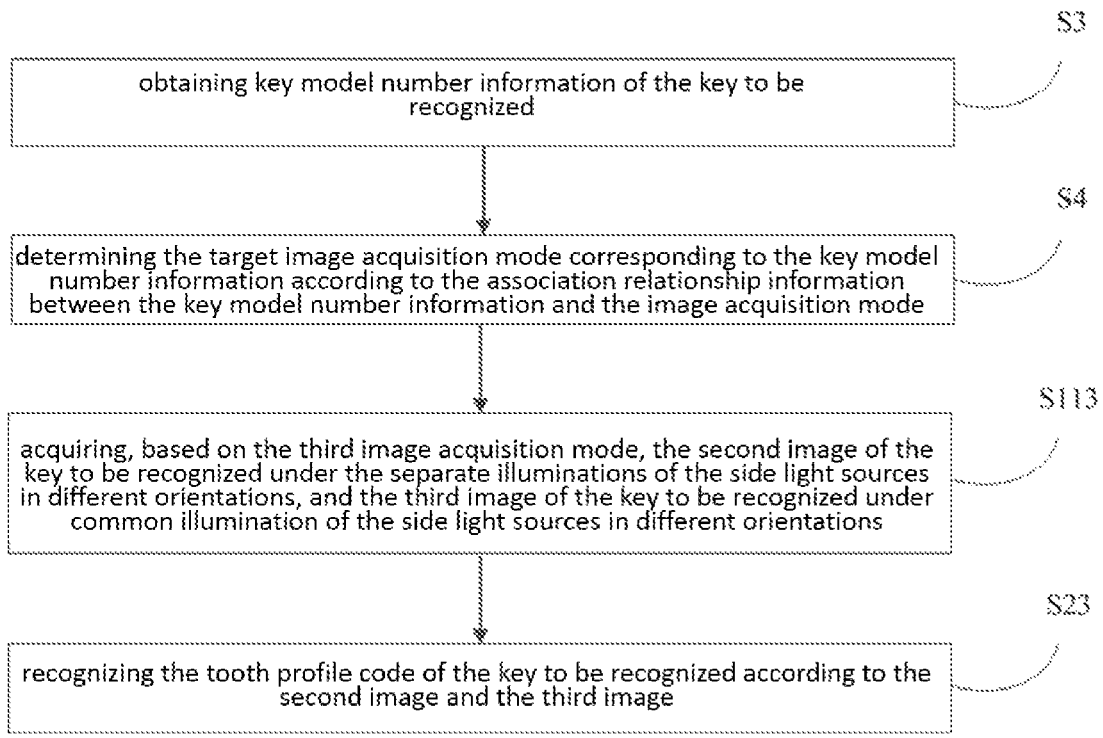
FIG. 15 is a schematic flowchart of implementation of steps 11 and 2 provided by another embodiment of the present disclosure.

As shown in FIG. 15, in one embodiment, the target image acquisition mode comprises a third image acquisition mode in which only side light sources are enabled.

The step 11 comprises:

Step 113. acquiring, based on the third image acquisition mode, a second image of the key to be recognized under the separate illuminations of the side light sources in different orientations, and the third image of the key to be recognized under the common illumination of the side light sources in different orientations.

The third image acquisition mode refers to a mode in which only the side light sources are enabled for image acquisition. The images acquired by the third image acquisition mode comprise the second image and the third image.

Specifically, enabling more than two side light sources at the same time can realize the backlight effect of the backlight light source. It is possible to turn on more than two side light sources firstly, and use the camera to acquire the third image under the common illumination of two or more side light sources, and then activate a single side light source each time to continue the image acquisition until the image acquisition of each side light source, as set, is completed.

The step 2 comprises:
Step 23. recognizing the tooth profile code of the key to be recognized according to the second image and the third image.

Based on the above embodiment, for a key of the outer contour type, the key tooth profile code can be determined directly based on the outermost edge contour of the image. As for the key of the inner contour type, the image acquired by the back light source and the image acquired by the side light source can be combined into the same coordinate system, wherein the image acquired by the back light source provides the outermost edge features of the key, and the image acquired by the side light source provides features of the part of the key where the tooth profile is located. The tooth profile code of the key to be recognized is determined based on the outermost edge feature and the features of the tooth profile part.

In the above key tooth profile recognition method, the second image of the key to be recognized under the separate illumination of the side light sources in different orientations and the third image of the key to be recognized under the common illumination of the side light sources in the different orientations are acquired based on the third image acquisition mode. The tooth profile code of the key to be recognized is recognized according to the second image and the third image. Through the above mode, the outer contour boundary features and the inner contour tooth profile features of the key of the inner contour type can be respectively highlighted in different images, which is convenient for image recognition and helpful to improve the accuracy of key tooth profile code recognition. Even if the back light source is not enabled, the key tooth profile code can be accurately recognized.

Figure 16:
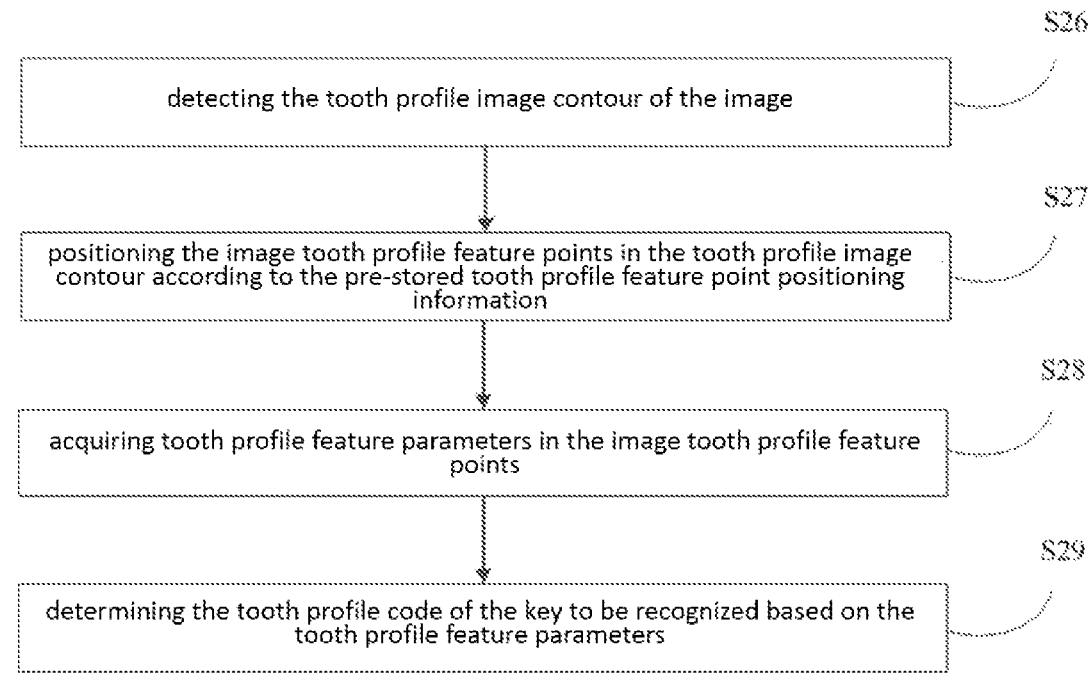
FIG. 16 is a schematic flowchart of step 2 provided by yet another embodiment of the present disclosure.

As shown in FIG. 16, in an embodiment, the step 2 comprises:
Step 26. detecting the tooth profile image contour of the image. The tooth profile image contour refers to the contour of the key tooth profile part in the image. Specifically, based on the foregoing embodiment, when step 27 is performed, the image may be corrected firstly to obtain a corrected image, and then the tooth profile image contour may be detected from the corrected image. As for the corrected image of the key to be recognized of the outer contour type, the contour of the key is recognized based on the image grayscale using the image edge detection algorithm, and the contour of the tooth profile image is obtained. As for the corrected image of the key to be recognized of the inner contour type, the image can be subjected to the differential processing firstly, and the tooth profile image contour can be obtained based on the differential processing structure.
Step 27. positioning the image tooth profile feature points in the tooth profile image contour according to the pre-stored tooth profile feature point positioning information.

Figure 17:
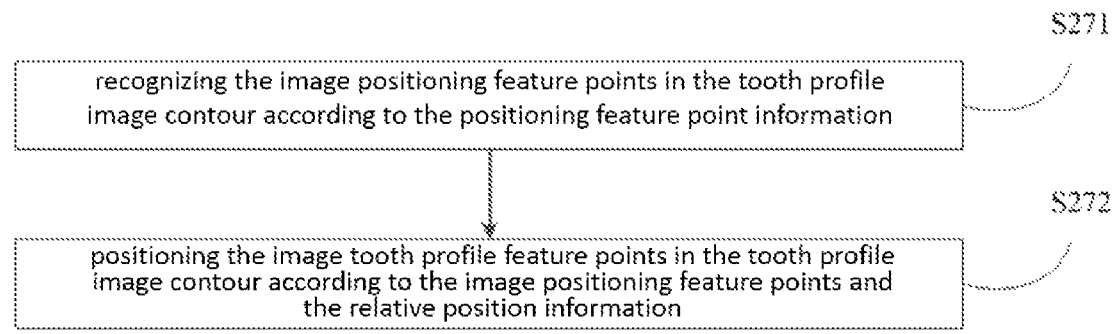
FIG. 17 is a schematic flowchart of step 27 provided by an embodiment of the present disclosure.

As shown in FIG. 17, in an embodiment, the tooth profile feature point positioning information comprises positioning feature point information and relative position information between the tooth profile feature point and the positioning feature point. The step 27 comprises:
Step 271. recognizing the image positioning feature points in the tooth profile image contour according to the positioning feature point information; and
Step 272. positioning the image tooth profile feature points in the tooth profile image contour according to the image positioning feature points and the relative position information.

Specifically, the feature point positioning information refers to the information used to position the image tooth profile feature points in the tooth profile image contour. The image tooth profile feature point refers to the corresponding point of the tooth point of the key in the tooth profile image contour. The positioning feature point refers to the feature point in the image that is easy to be recognized and capable of being used to position the image tooth profile feature points. The positioning feature point information comprises the type information of the positioning feature points. For example, the type of the positioning feature point may be a right-angle positioning feature point k1 or a vertex positioning feature point k2. Keys of different types may use different types of positioning feature points. For example, if the positioning feature point corresponding to the key type of the key to be recognized is a right-angle point, the point corresponding to the right angle in the tooth profile image contour can be recognized as the positioning feature point. After obtaining the first image, the reference point and the image positioning feature point in the image are firstly recognized, and the image transformation ratio is determined based on the distance between the reference point in the image and the pre-stored reference point. The rectangular coordinate system of the image is constructed based on the image positioning feature points in the image and the corrected image plane of the x' axis. The position of the tooth in the rectangular coordinate system of the image, that is, the position of the image tooth profile feature point, is determined based on the transformation ratio and the distance between the pre-stored positioning feature point and the tooth profile feature point.

Step 28. obtaining tooth profile feature parameters in the image tooth profile feature points.
Specifically, based on the above embodiment, the value of each image tooth profile feature point in the image on the y' axis perpendicular to the x' axis can be obtained, and the y' value corresponding to each image tooth profile feature point can be used as the tooth profile feature parameter.
Step 29. determining the tooth profile code of the key to be recognized based on the tooth profile feature parameters.

After obtaining the above-mentioned tooth profile feature parameters, the specification parameter sequence of the actual tooth points of the key to be recognized is determined based on the image transformation ratio, and the specification parameter sequence is used as the tooth profile code.

In the above key tooth profile recognition method, the tooth profile image contour of the image is detected firstly, and then the image tooth profile feature points in the tooth profile image contour are positioned according to the pre-stored tooth profile feature point positioning information, and then the tooth profile feature parameters in the image tooth profile feature points are determined, and the tooth profile code of the key to be recognized is determined based on the tooth profile feature parameters. Through the above method, the position of the tooth profile feature point in the image can be accurately positioned, and a reliable tooth profile code recognition result can be obtained.

In addition, the present disclosure also proposes a key tooth profile code recognition device. The key tooth profile code recognition device comprises a memory, a processor, and a key tooth profile code recognition program stored in the memory and capable of running on the processor. When the key tooth profile code recognition program is executed by the processor, the steps of the key tooth profile code recognition method as described in the above embodiments are realized.

In addition, the present disclosure also proposes a storage medium. The storage medium comprises a key tooth profile code recognition program. When the key tooth profile code recognition program is executed by the processor, the steps of the key tooth profile code recognition method as described in the above embodiments are realized.

It should be noted that in this specification, the terms "include", "contain" or any other variants thereof are intended to cover the meaning of non-exclusive inclusion, so that a process, method, entity or system comprising a series of elements not only comprises those elements, but it also comprises other elements not explicitly listed, or elements inherent to the process, method, entity, or system. Without more restrictions, the element defined by the sentence "comprising a . . . " does not exclude the existence of other identical elements in the process, method, entity or system that comprises the element.

The sequence numbers of the above-mentioned embodiments of the present disclosure are only for description, and do not indicate the advantages and disadvantages of the embodiments.

Through the description of the foregoing embodiments, those skilled in the art can clearly understand that the foregoing embodiment methods can be implemented by means of software plus a necessary general hardware platform. Of course, hardware can also be used, but in many cases the former is a better embodiment. Based on this understanding, the technical solution of the present disclosure essentially, in other words, the part that contributes to the prior art, can be embodied in the form of a software product. The computer software product is stored in a storage medium (such as ROM/RAM, magnetic disks, optical disks) as described above. It comprises several instructions to make a terminal device (which can be a TV, a mobile phone, a computer, a server, an air conditioner, or a network device, etc.) execute the methods described in the various embodiments of the present disclosure.

The above are only the preferred embodiments of the present disclosure, and do not limit the patent scope of the present disclosure. Any equivalent structure or equivalent process transformation made by using contents of the specification and drawings of the present disclosure, or any application directly or indirectly applied to other related technical field, is similarly included in the scope of patent protection of the present disclosure.

INDUSTRIAL APPLICABILITY

The embodiments of the present disclosure provide a key tooth profile code recognition method, device and storage medium. In this method, an image of the key to be recognized is firstly acquired by using a back light source and/or side light sources; and the tooth profile code of the key to be recognized is recognized based on the image. During the recognition process of the tooth profile code, there is no mechanical contact with the tooth profile code part to avoid wear of the key tooth profile. In the recognition process, what needs manual operation is mainly to put the key to be recognized into the image acquisition device. The operation is simple and does not require professional skills. It is helpful to improve the efficiency and accuracy of tooth profile code recognition, and use of the back light source and/or the side light sources can highlight the key tooth profile information in the image, which is convenient for image processing and improves the recognition accuracy.

The box body in the image acquisition device provided by the present disclosure plays a role of blocking the light, reducing the interference of external light sources, and obtaining images comprising prominent tooth profile features, which facilitates the tooth profile code recognition on the image, and improves the recognition accuracy. Providing the side light sources to illuminate the key to be recognized twice improves the definition of the tooth profile contour in the acquired image, highlights the tooth profile features in the image, and improves the recognition accuracy. It is suitable for keys with different tooth profile feature types, expanding the recognition range.

What is claimed is:

1. A key tooth profile code recognition method, wherein the key tooth profile code recognition method comprises:
    using a back light source and/or side light sources to acquire an image of a key to be recognized; and
    recognizing a tooth profile code of the key to be recognized, based on the image, wherein the recognizing a tooth profile code of the key to be recognized, based on the image comprises:
    performing an image correction on the image to obtain a corrected image after correction, wherein the image correction comprises:
    association relationship between a key type and the perspective feature point information corresponding to the key type is pre-established, perspective feature points in the acquired image are firstly recognized based on the key type, and the original coordinates of the perspective feature points in the original image are obtained, the perspective transformation matrix is calculated according to the original coordinates of the perspective feature points and the set target coordinates, and then the perspective transformation matrix is used to perform the perspective transformation processing on the acquired image, so as to obtain a corrected image after the perspective transformation processing, then the tooth profile features are extracted from the corrected image to obtain the tooth profile code of the key to be recognized;
    when there are multiple images acquired by the camera light sources in different orientations as for the same key to be recognized, the perspective transformation matrix is calculated based on one of the images, and then the same perspective transformation matrix is used to perform the perspective transformation processing on multiple images of the same key to be recognized, so as to obtain multiple corrected images on the same plane and with the same transformation specifications; and
    determining the tooth profile code of the key to be recognized based on the corrected image.

2. The key tooth profile code recognition method according to claim 1, before using a back light source and/or side light sources to acquire an image of a key to be recognized, the key tooth profile code recognition method further comprising:

obtaining key model number information of the key to be recognized; and determining a target image acquisition mode corresponding to the key model number information according to association relationship information between the key model number information and an image acquisition mode, wherein using a back light source and/or side light sources to acquire an image of a key to be recognized comprises:

using the back light source and/or the side light sources to acquire an image of the key to be recognized, based on the target image acquisition mode.

3. The key tooth profile code recognition method according to claim 2, wherein the target image acquisition mode comprises a first image acquisition mode in which only the back light source is enabled, and using the back light source and/or the side light sources to acquire an image of the key to be recognized, based on the target image acquisition mode comprises:

acquiring a first image of the key to be recognized under separate illumination of the back light source, based on the first image acquisition mode; and recognizing a tooth profile code of the key to be recognized, based on the image comprises:

recognizing the tooth profile code of the key to be recognized according to the first image.

4. The key tooth profile code recognition method according to claim 3, wherein the target image acquisition mode comprises a second image acquisition mode in which the back light source and the side light sources are respectively enabled, and using the back light source and/or the side light sources to acquire an image of the key to be recognized, based on the target image acquisition mode comprises:

acquiring, based on the second image acquisition mode, a first image of the key to be recognized under separate illumination of the back light source and a second image of the key to be recognized under separate illuminations of side light sources in different orientations, and recognizing a tooth profile code of the key to be recognized, based on the image comprises:

recognizing the tooth profile code of the key to be recognized according to the first image and the second image.

5. The key tooth profile code recognition method according to any one of claim 2, wherein the target image acquisition mode comprises a second image acquisition mode in which the back light source and the side light sources are respectively enabled, and using the back light source and/or the side light sources to acquire an image of the key to be recognized, based on the target image acquisition mode comprises:

acquiring, based on the second image acquisition mode, a first image of the key to be recognized under separate illumination of the back light source and a second image of the key to be recognized under separate illuminations of side light sources in different orientations; and recognizing a tooth profile code of the key to be recognized, based on the image comprises:

recognizing the tooth profile code of the key to be recognized according to the first image and the second image.

6. The key tooth profile code recognition method according to any one of claim 2, wherein the target image acquisition mode comprises a third image acquisition mode in which only the side light sources are enabled, and using the back light source and/or the side light sources to acquire an image of the key to be recognized, based on the target image acquisition mode comprises:

acquiring, based on the third image acquisition mode, a second image of the key to be recognized under separate illuminations of side light sources in different orientations, and a third image of the key to be recognized under common illumination of the side light sources in different orientations; and recognizing a tooth profile code of the key to be recognized, based on the image comprises:

recognizing the tooth profile code of the key to be recognized according to the second image and the third image.

7. The key tooth profile code recognition method according to any one of claim 1, wherein recognizing a tooth profile code of the key to be recognized, based on the image comprises:

detecting a tooth profile image contour of the image;

positioning image tooth profile feature points in the tooth profile image contour according to pre-stored tooth profile feature point positioning information;

obtaining tooth profile feature parameters in the image tooth profile feature points; and determining the tooth profile code of the key to be recognized based on the tooth profile feature parameters.

8. The key tooth profile code recognition method according to claim 7, wherein the tooth profile feature point positioning information comprises positioning feature point information and relative position information between tooth profile feature points and positioning feature points, and recognizing a tooth profile code of the key to be recognized, based on the image comprises:

recognizing image positioning feature points in the tooth profile image contour according to the positioning feature point information; and positioning the image tooth profile feature points in the tooth profile image contour according to the image positioning feature points and the relative position information.

9. A key tooth profile code recognition device, wherein the key tooth profile code recognition device comprises: a memory, a processor, and a recognition program stored in the memory and capable of running on the processor, wherein when the recognition program is executed by the processor, steps of the key tooth profile code recognition method according to any one of claim 1 are realized.

10. An image acquisition device, wherein the image acquisition device is applicable to step 1 of claim 1; the image acquisition device comprises a back light source and/or side light sources, and the image acquisition device further comprises a box body and a camera, wherein the box body is provided with a key inlet outlet opening; the camera and the side light sources are all arranged inside the box body and connected to an inner wall of the box body; an orientation of the camera is perpendicular to an orientation of the key inlet outlet opening; the side light sources are arranged on periphery of a key placement area in the box body; and the back light source is arranged inside the box body and connected to the inner wall of the box body, and the camera and the back light source are respectively arranged on both sides of the key placement area.

11. The image acquisition device according to claim 10, wherein the image acquisition device further comprises a light homogenizing sheet, wherein the light homogenizing sheet is connected to the inner wall of the box body and is arranged inside the box body, and arranged between the back light source and the key placement area, and perpendicular to the orientation of the camera.

12. The image acquisition device according to any one of claim 10, wherein
the image acquisition device further comprises a key fixing member, wherein the key fixing member enters the key inlet outlet opening, from outside of the box body, passing through a side plate where the key inlet outlet opening is located, and fixes the key to be recognized that has entered the key inlet outlet opening.

13. The image acquisition device according to any one of claim 10, wherein
the image acquisition device further comprises a connecting member, wherein the connecting member is connected to a second side plate of the box body, and the second side plate is facing the camera directly, and the back light source is connected to the connecting member.

14. The image acquisition device according to claim 13, wherein the back light source comprises a first light source fixing plate and a plurality of first luminous bodies, wherein the first luminous bodies are evenly spread and fixed on the first light source fixing plate, and the first light source fixing plate is connected with the connecting member.

15. The image acquisition device according to any one of claim 13, wherein
the image acquisition device further comprises a light homogenizing sheet, and the connecting member comprises a first layer connecting member and a second layer connecting member, wherein the back light source is connected with the first layer connecting member, the light homogenizing sheet is connected with the second layer connecting member, and the light homogenizing sheet is arranged between the back light source and the key placement area, and the light homogenizing sheet is arranged in parallel with the second side plate.

16. The image acquisition device according to any one of claim 13, wherein
the side light sources comprise a second light source fixing plate and a plurality of second luminous bodies, wherein the plurality of second luminous bodies are evenly spread and fixed on the second light source fixing plate, the second light source fixing plate is connected to the connecting member, and a distance between the second luminous bodies and the second side plate is equal to a distance between the key placement area and the second side plate.

17. The image acquisition device according to any one of claim 10, wherein
the back light source is configured to illuminate a key of an outer contour type in which a tooth profile is arranged at an outermost edge on both sides of the key, and the side light sources are configured to illuminate a key of an inner contour type in which a tooth profile of the key is arranged in an area inside the outermost edge on both sides of the key, instead of the outermost edge.

18. The image acquisition device according to any one of claim 10, wherein
the side light sources are arranged in three orientations, around the key placement area, except for an orientation where the key inlet outlet opening is located, forming a "U" shaped side light source, and the key inlet outlet opening is located at an opening side of the "U" shaped side light source.

19. The image acquisition device according to claim 18, wherein the side light sources set in the three orientations are independently controlled.

* * * * *